Aug. 9, 1960 W. H. J. NICOLAI 2,948,782
AUTOMATIC TELEPHONE EXCHANGES HAVING
CONNECTIONS TO EXTERNAL LINES
Filed May 19, 1958
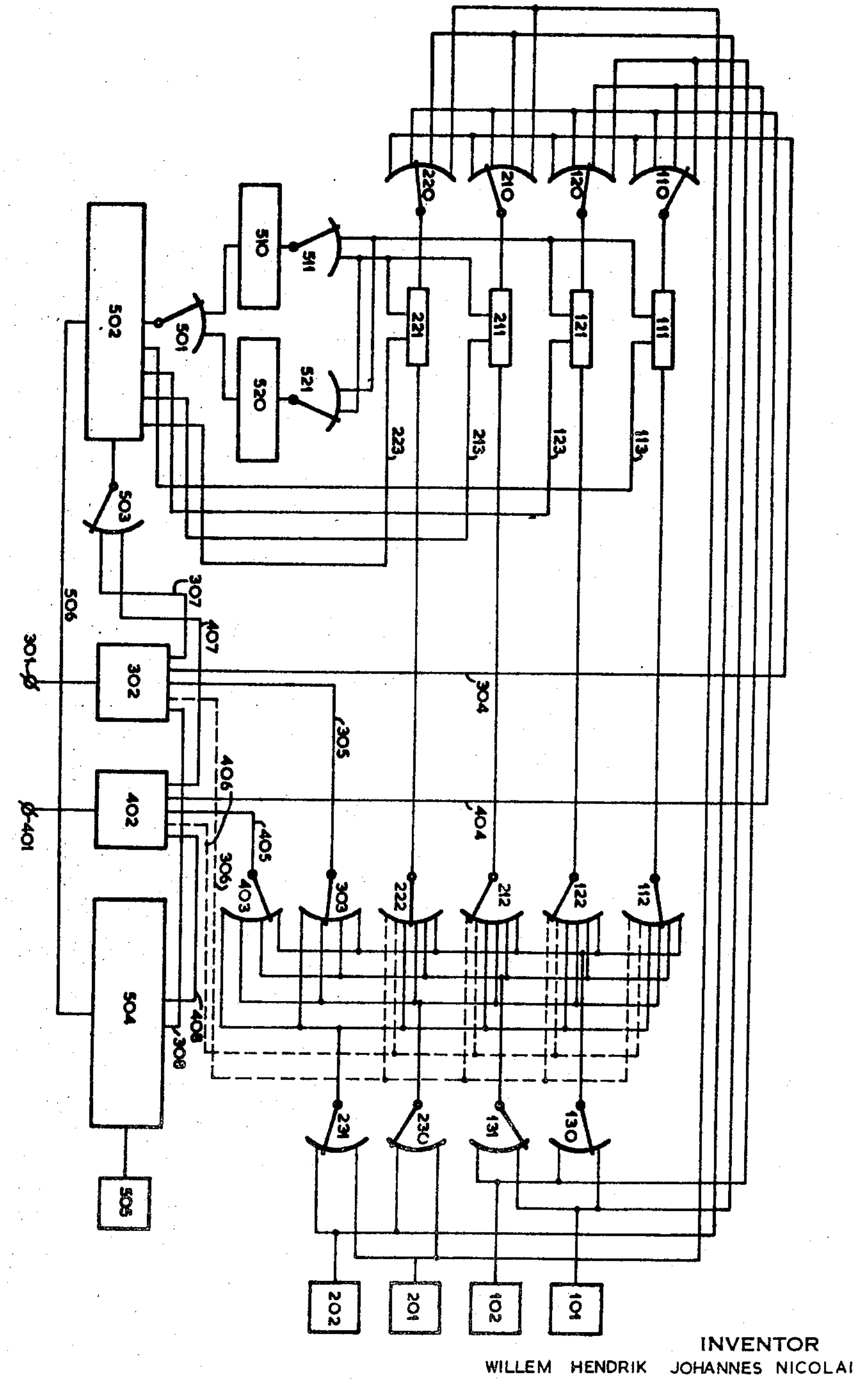
INVENTOR
WILLEM HENDRIK JOHANNES NICOLAI
BY
AGENT 2,948,782

AUTOMATIC TELEPHONE EXCHANGES HAVING CONNECTIONS TO EXTERNAL LINES

Willem Hendrik Johannes Nicolai, Hilversum, Netherlands, assignor to North American Philips Company, Inc., New York, N.Y., a corporation of Delaware Filed May 19, 1958, Ser. No. 736,072

Claims priority, application Netherlands June 7, 1957

4 Claims. (Cl. 179—18)

The invention relates to an automatic telephone exchange, having connections to external lines, in which exchange, in the case of a call for an internal connection, a free register connects itself via a reduction stage, a free connecting circuit and a second reduction stage, to the calling subscriber and, after the reception of information about the desired internal connection, with the aid of a controlling member, which may be independent, connects the occupied connecting circuit via a selecting circuit to the wanted subscriber, whereas a call entering via an external line is conducted via a line repeater to an operator's set or to a register, the operator or the register, subsequent to the reception of the information about the desired connection, establishing this connection by the adjusting member via a line repeater and a line selecting stage connected thereto.

Known automatic telephone exchanges of this kind may be characterized, in general, by the fact that a desired connection is established by successive prolongation of an existing connection or part thereof. This has the disadvantage that sometimes unnecessarily long connections are composed, so that consequently certain connections occupy an undesirably large part of the exchange apparatus.

It will be assumed, by way of example, that the exchange concerned has two series-connected selecting stages consisting of group selectors and final selectors. The first-mentioned reduction stage consists of connecting-circuit finders, and the second mentioned reduction stage of call finders. If a subscriber of the exchange wants a connection to a free external line, he lifts his telemicrophone. Thus a free register is actuated and the register connects itself through the connecting-circuit finder connected thereto to a free connecting circuit leading to the calling subscriber, after which the call finder connected to the said connecting circuit connects this connecting circuit to the calling subscriber. After the reception of the dial tone from the register, the subscriber can select the digit associated with an external line, for example the digit 0. Then, with the aid of an adjusting member, the register prolongs the connection: subscriber, call finder, connecting circuit, by the path connecting circuit, group selector, free line repeater, free external line. Thus the wanted connection between the subscriber and an external line is established and the register and the adjusting member switch off automatically. However, there is the shorter path: subscriber, final selector, line group selector, line repeater, external line. The last mentioned path is also composed when a call enters via an external line. This shorter path does, in particular, not pass via a connecting circuit, so that it does not occupy a call finder and a group selector.

The disadvantage referred to is still more manifest in the following case. It is assumed that with a private exchange having direct-line connections, a call enters through a direct line and that subsequently the direct line is connected via the direct-line repeater connected thereto, a direct-line group selector and a final selector, to the wanted subscriber of the private exchange. It is assumed that this subscriber wants to consult a further subscriber of the private exchange. To this end he depresses a button, provided for this purpose, so that the direct-line repeater retains the direct line, but the subscriber-direct-line connection contained herein is replaced by the connection of the subscriber to a consulting cable, which is multipled to given bank contacts of the call finders. At the same time a free register starts and connects itself to the subscriber via the path: connecting circuit finder, free connecting circuit, call finder, consulting cable, direct-line repeater, direct-line group selector, final selector. When the register has received information about the wanted other subscriber, the existing connection: subscriber, call finder, connecting circuit, is prolonged by the path: group selector, final selector, other subscriber, after which the register and the adjusting member switch off automatically. If this other subscriber wants to take over the connection to the direct line, he also depresses his knob and, consequently, the existing connection of the first subscriber to the consulting cable is replaced in the direct-line repeater by the connection of the direct line to the consulting cable. Thus the connection: direct line repeater, consulting cable, call finder, connecting circuit, group selector, final selector, other subscriber is established. Also in this case there is a shorter path via a final selector, which path, in particular, does not pass via a connecting circuit.

From the foregoing it is evident that the principle previously applied to compose connections by prolonging existing connections or parts thereof, is not the most efficient one and had better be replaced by the principle to establish the shortest connection, if a connection between two points of the exchange is wanted. When developing this principle further, it is found that this can be carried out with an exchange of the kind described not only with comparatively simple switching elements, but that automatically a few additional advantages are obtained, which permit a simplification of parts of the exchange. In accordance with the invention the adjusting member builds up also outgoing connections with an external line via the selection stage connected to the external line concerned, i.e. by passing the connecting circuits. It should be noted that the register must be capable of accomplishing two distinctly different functions, i.e. firstly the reception and temporary retaining of the information about the wanted connection and secondly the composition of this connection. It may sometimes be efficient to have these functions accomplished in separate members. The member for the first function is, in this case, a register in the narrower sense. The member for the accomplishment of the second function is a controlling member. Since the latter becomes active only during the building up of the connection, the exchange may comprise fewer controlling members than registers; it may even have only one controlling member and two or more registers. The invention is completely independent of the fact whether each register is provided with an associated controlling member, or whether two or more registers co-operate with a smaller number of controlling members.

One embodiment of the invention will be explained more fully with reference to the drawing. The drawing shows the construction of a private exchange with direct-line connections in accordance with the invention. In this figure reference numerals 101, 102, 201 and 202 designate subscribers' sets. These sets are grouped in hundreds; of each group b.v. of hundred two subscribers' sets are shown. The exchange has connections to two direct lines 301 and 401. The numbering of the members of the exchange is such that the numerals of the members relating particularly to the first group of one hundred subscribers sets lie in the interval between 101 and 199, the numerals of the members relating particularly to the second group of one hundred subscribers sets lie in the interval between 201 and 299, the numerals relating particularly to the first direct line lie in the interval between 301 and 399, the numerals of the members relating particularly to the second direct line lie in the interval between 401 and 499 and the numerals of the members not relating particularly to a group of hundred or to a direct line lie in the interval between 501 and 599.

The subscriber sets of the first and the second group of hundred are multipled to the bank contacts of a plurality of call finders 110 and 120, and 210 and 220 respectively and of a plurality of final selectors 130, 131 and 230, 231 respectively. The wipers of the call finders are connected to connecting circuits 111, 121, 211, 221. These connecting circuits are furthermore connected to the wipers of call finders 112, 122, 212, 222, to the relatively multipled bank contacts of two connecting-circuit finders 511, 521 and, via control cables 113, 123, 213, 223, to a controlling member 502. The wipers of the connecting-circuit finders are connected to two registers 510 and 520, which, in turn, are connected via a register finder 501 to the controlling member 502.

The direct lines 301, 401 terminate in the exchange in direct-line repeaters 302, 402, which are connected via the cables 305 and 405 to the wipers of two direct-line group selectors 303, 403, via consulting cables 304, 404, to multipled special bank contacts of the call finders 110, 120, 210, 220 via cables 307, 407, to bank contacts of a direct-line finder 503, of which the wipers are connected to the controlling member 502, and via cables 308, 408 to a control circuit 504. The control circuit 504 is connected to an operator's set 505 and via a cable 506 to the controlling member 502. The bank contacts of the group selectors 112, 122, 212, 222 and direct-line group selectors 303, 403 are multipled to one another and furthermore are connected to the wipers of the final selectors 130, 131, 230, 231.

The figure shows only unipolar switches and unifilar cables. In reality each switch has more than one wiper and each cable consists of more than one wire. The wipers may be distinguished by referred to the *a*-wiper, *b*-wiper, *c*-wiper and so on. The corresponding wires are termed the *a*-wire, *b*-wire, *c*-wire and so on. These additional wipers and wires serve, in known manner, for controlling and testing the composition of connections.

As a matter of course, each switch, particularly a switch with few outlets, may be replaced by other switching means, for example, a contact pyramid.

If the subscriber 101 wants to speak with subscriber 202, he lifts his telemicrophone. Thus a free register, for example the register 510, becomes operative and connects itself via its connecting circuit finder 511 to a free connecting circuit leading to the subscriber 101, for instance the connecting circuit 121. The test path passes via the *e*-wire of the adjusting cable 123. Thereupon the wipers of the call finder 121 start rotating, until the subscriber set 101 concerned is found, after which the call finder 120 stands still. The test path passes via *e*-wiper of the call finder 120. The subscriber 101 is then connected to the register 510 and receives a dial tone therefrom. Then he can dial the desired numeral 202, which is recorded in the register 510. Then the controlling member 502 becomes operative and connects itself to the register 510 via the register finder 501. The adjusting member 502 receives information from the register 510 about the connection to be established and thus adjusts via the control cable 123, the group selector 122, which is connected to the connecting circuit 121, to a final selector leading to the subscriber 202, for example the final selector 230. The test path passes via the *e*-wiper of the group selector 122. Then the final selector 230 starts rotating and stands still at the contacts of the subscriber 202. The test path passes again via the *e*-wiper of the final selector 230. The connection of subscriber 101 to subscriber 202 is then established, so that the register 510 and the controlling member 502 switch off and are again free.

However, if the subscriber 101 has dialled the digit of the external line, for example the digit 0, the controlling member 502 tries to find, via the external-line finder 503, a free external-line repeater, for the repeater 302. Then, via the external-line finder 503, the external-line group selector 303, which is connected to the external-line repeater, is rendered operative and adjusted to a final selector, for instance the final selector 131, leading to the subscriber 101. The test path passes via the *e*-wiper of the external-line group selector 303. Then the final selector 131 starts rotating and stands still at the contacts of the subscriber 101. By multiplying the *e*-contacts of the final selectors 130 and 131 to those of the call finders 110, 120, this does not give rise to any difficulty. The subscriber 101 is then connected via the final selector 131, the external-line group selector 303, the conductor 305, the external-line repeater 302, to the external line 301, after which the register 510 and the controlling member 502 switch off and are again released.

With known private exchanges the adjusting member would adjust, in this case, the group selector 122 via a cable 306 (shown in broken lines) to a bank contact connected to the external-line repeater 302 and the subscriber 101 would be connected via the path: call finder 120, connecting circuit 121, group selector 122, cable 306, external-line repeater 302, to the external line 301. The cables 306 and 400 which are then required between the bank contacts of the group selectors and the external-line repeaters are shown in broken lines in Fig. 1. In contradistinction to the exchange according to the invention the connection with known exchanges, in which the principle of the prolongation of existing connection is applied, is now established via a connecting circuit.

If, conversely, a call for the subscriber 101 is received via the external line 301, this call is first led to the operator's set 505 via the cable 308 and the controlling member 504. After having learned that a connection to the subscriber 101 is wanted, the telephone operator can have this connection build up by the controlling member 502 via the external-line group selector 303 and, for instance, the final selector 131. This is acomplished in the same manner in the exchanges according to the invention as in known exchanges.

From the foregoing it is evident that in an exchange according to the invention connections between subscribers and direct lines for outgoing and incoming communications are of the same kind, which is not the case with known exchanges. This is particularly advantageous, if the private exchange is to be arranged in a manner such that each subscriber, having a connection to an external line, must be capable of having a consultation with a further subscriber of the private exchange and to transfer the connection to that direct line to the said subscriber.

As an example, assume that subscriber 101 is connected to the direct line 301 via the final selector 131, the direct-line group selector 303, the cable 305, the external-line repeater 302. When he depresses a special knob, termed the earth knob, since a connection to earth is established by the depression of this knob, a free register, for instance the register 510 is actuated. This register connects itself in the manner described via connecting-circuit finder 511, a free connecting circuit, for instance 121, call finder 120, consultation line 304, to the direct-line repeater 302. At the same time a change-over takes place in the external-line repeater 302, so that the external line 301 is held, but the connection between the cable 305 and the external line 301 is replaced by a connection between the cable 305 and the consulting cable 304. The subscriber 101 is then connected to the register 510 (via final selector 131, external-line group selector 303, cable 305, external-line repeater 302, consulting cable 304, call finder 120, connecting circuit 121, connecting circuit finder 511) and is allowed to dial the numeral of a further subscriber, for instance the subscriber 202. When this numeral has been transferred to the controlling member 502, this member adjusts first the group selector 122 to a free final selector leading to the subscriber 202, for instance to the final selector 230 and then the final selector 231 to the subscriber 202. Then a connection is established via final selector 131, external-line repeater 302, consulting cable 304, call finder 120, connecting circuit 121, group selector 122, final selector 230 between the subscribers 101 and 202, whilst the external-line 301 is held. When subscriber 101 again depresses his earth knob, this connection has deducted from it the stretch: final selector 131, external-line group selector 303, conductor 305, external-line repeater 302 and in the external-line repeater the connection of the conductor 305 to the external line 301 is restored, so that the subscriber 101 is again connected to the external line 301. On the contrary, if the subscriber 202 pushes his earth button, the connection between the external-line repeater 302 and the final selector 131 is interrupted, so that this final selector and also the subscriber 101 are freed. Then the external-line group selector 303 finds the bank contacts of subscriber 202 connected to the final selector 230. This is rendered possible by applying via the consulting cable 304, call finder 120, connecting circuit 121, group selector 122, a marking voltage to the bank contact concerned. As soon as the external-line group selector has reached the bank contact concerned, the connection between the consulting cable 304, call finder 120, connecting circuit 121, group selector 122 is broken. The subscriber 202 is then connected to the direct line 301 (he has taken over this connection from subscriber 101 via final selector 230, external-line group selector 303, cable 305, external-line repeater 302). Since the subscriber 202, taking over the connection, is connected via a path of the same kind as the first subscriber 101 to the direct line 301, the subscriber 202 can perform exactly the same operations (consultation with or transfer to a further subscriber) as the first subscriber 101, without the need for additional means in the exchange.

With the known exchanges, the subscriber 202, when depressing his earth button, would replace, in the direct-line repeater, the connection of the consulting cable 304 to the cable 305, by the connection between the consulting cable 304 and the direct line 301. Thus the subscriber is connected via the path: final selector 230, group selector 122, connecting circuit 121, call finder 120, consulting cable 304, external-line repeater 302, to the external line 301. This path passes via a connecting circuit and is of a kind differing from the path via which the subscriber 101 had been connected to the external line 301.

From the foregoing it is obvious that the general construction of an exchange according to the invention does not differ in principle from that of known exchanges. The exchange according to the invention, however, is somewhat simpler than the known exchanges in two respects. Firstly the selecting stage from the connecting circuit to the subscribers need not comprise contacts connected to the external-line repeaters (the lines 306 and 406 indicated in broken lines). Secondly, with a private exchange the external-line repeaters may be simpler, since with incoming, outgoing and transferred connections of an external line to a subscriber of the private exchange these repeaters are included in the connection in the same manner.

The controlling member of an exchange according to the invention must, however, operate in a slightly different manner as compared with the controlling member of known exchanges. It has to establish a connection between two given points so that this connection is the most economic one. This implies that the member must be capable not only of prolonging an existing connection to a wanted point, but also of replacing it whilst disengaging wholly or partly an existing connection, by the most economic connection between the two points concerned. However, the construction of controlling member in accordance with this principle is not difficult to those skilled in the art.

It should finally be noted that the idea of the invention is independent of the number of stages of the various reducing and selecting stages and of the form of construction of these stages. They therefore need not expressly be composed by switches connected as finders or selectors; they may alternately be constituted by contact pyramids or electronic switching means.

What we claim is:

1. An automatic telephone exchange of the type having a plurality of subscribers sets and at least one external line, said exchange comprising at least one register means, a plurality of connecting circuit means, first reducing stage means connecting said register means to said connecting circuit means, second reducing stage means connecting said subscribers sets to said connecting circuit means, selecting stage means, controlling means operable in cooperation with said register means to selectively connect said connecting circuit means to a desired subscribers set by way of said selector means, external line repeater means connected to said external line, and line selecting stage means connected to said repeater means, said controlling means being operable in response to outgoing calls to establish a connecting channel between said external line and a subscribers set, said connecting channel comprising said external line repeater means and said line selecting stage means and excluding said connecting circuit means.

2. The exchange of claim 1 in which said controlling means is operable, upon transfer of connections between said external line and one subscribers set to said external line and another subscribers set, to establish a connecting channel between said external line and other subscribers set, said last mentioned connecting channel comprising the same elements as the first mentioned connecting channel.

3. An automatic telephone exchange of the type having a plurality of subscribers sets and at least one external line, said exchange comprising a plurality of register means, a plurality of connecting circuit means, first reducing stage means connecting said register means to said connecting circuit means, second reducing stage means connecting said subscribers sets to said connecting circuit means, first and second selecting stage means, controlling means operable in cooperation with said register means to selectively connect said connecting circuit means to a desired subscribers set by way of said first and second selecting stages, external line repeater means connected to said external line, and line selecting stage means connected to said repeater means, said controlling means being operable in response to outgoing calls to establish a connecting channel between said external line and a subscribers set, said connecting channel comprising said external line repeater means, said line selecting stage means, and said second selecting stage means, and excluding said connecting circuit means and first selecting stage means.

4. An automatic telephone exchange of the type having a plurality of subscribers sets and at least one external line, said exchange comprising at least one register means, a plurality of connecting circuit means, first reducing stage means connecting said register means to said connecting circuit means, second reducing stage means connecting said subscribers sets to said connecting circuit means, selecting stage means, controlling means operable in cooperation with said register to selectively establish an internal connection between subscribers sets and to release said register means and controlling means upon establishing said internal channel, said internal channel comprising said second reducing stage means, said connecting circuit meas, and said selecting stage means, external line repeater means connected to said external line, and line selecting stage means connected to said repeater means, said controlling means being operable in response to an outgoing call to establish an external channel between said external line and a subscribers set, said external channel comprising said external line repeater means and said line selecting stage means and excluding said connecting circuit means.

References Cited in the file of this patent

UNITED STATES PATENTS 2,496,902 Voss -------------------- Feb. 7, 1950